United States Patent [19]
Nordenberg et al.

[11] Patent Number: 5,460,127
[45] Date of Patent: Oct. 24, 1995

[54] STEAM BOILER

[75] Inventors: Lennart Nordenberg, Västra Frölunda; Ola Herstad, Torslanda, both of Sweden

[73] Assignee: Gotaverken Energy AB, Gothenburg, Sweden

[21] Appl. No.: 117,719

[22] Filed: Sep. 8, 1993

[51] Int. Cl.$^6$ .................. B09B 3/00; F22B 1/00
[52] U.S. Cl. .................. 122/4 D; 110/245
[58] Field of Search .................. 122/4 D; 110/245

[56] References Cited

U.S. PATENT DOCUMENTS

| | | |
|---|---|---|
| 1,351,154 | 8/1920 | Broido . |
| 2,271,652 | 7/1939 | Languand et al. . |
| 2,368,211 | 1/1945 | Fletcher . |
| 2,623,505 | 12/1952 | Armacost . |
| 2,871,833 | 2/1959 | Koch . |
| 2,887,095 | 5/1959 | Vorkauf . |
| 4,651,653 | 3/1987 | Anderson et al. ............ 110/245 |
| 4,739,729 | 4/1988 | Rettemeier et al. . |
| 4,913,097 | 4/1990 | Derken et al. ............ 122/4 D |
| 4,932,363 | 6/1990 | Kuivalainen ............ 122/4 D |
| 5,078,065 | 1/1992 | Tsunemin et al. ............ 110/245 |
| 5,103,773 | 4/1992 | Andersson et al. ............ 122/4 D |
| 5,105,747 | 4/1992 | Khinkis et al. ............ 110/245 |
| 5,141,708 | 8/1992 | Campbell, Jr. et al. ............ 110/245 |

FOREIGN PATENT DOCUMENTS

| | | |
|---|---|---|
| 0197378 | 10/1986 | European Pat. Off. . |
| 2384204 | 10/1978 | France . |
| 0391458 | 3/1924 | Germany . |
| 0717064 | 2/1942 | Germany . |
| 3207433 | 9/1983 | Germany . |
| 0301209 | 5/1968 | Sweden . |
| 0222115 | 8/1968 | Sweden . |
| 0468295 | 12/1992 | Sweden . |
| 0668504 | 4/1954 | United Kingdom . |
| 1418456 | 12/1975 | United Kingdom . |
| 1582534 | 1/1981 | United Kingdom . |

OTHER PUBLICATIONS

Sistemas de alto rendimiento para quemado de cortezas y lodos en la industria de pasta y papel, R. Jagerlund, Gotaverken Energy AB (Spanish Language) May 1991.
Gotaverken Power Boilers for Firing of Bark and Sludge in the Pulp and Paper Industry by R. Jagerlund, Gotaverken Energy AB Nov. 1991.
Efficient firing of bark and sludge in the pulp–and paper industry by R. Jagerlund, Gotaverken Energy AB. Madrid, Spain. May 1991.
Efficient firing of bark and sludge in the pulp and paper industry Jun. 1992 by R. Jagerlund, Gotaverken Energy AB, Fort Frances, Ont. Canada.
Wood–Fired Boilers, Gotaverken Energy (brochure).
List of installation–Wood fired boilers, Gotaverken Energy (brochure) Sep. 1992.
Gotaverken Turnkey Wood–Fired Power Boiler Plant for Canadian Pacific Forest Produts Ltd. Gotaverken Energy (brochure).
Wood Fired Power Boilers, Gotaverken Energy (brochure).
Gotaverken boilers "The Power to Generate Profits" Gotaverken Energy (brochure).
Wood–Fired Boilders, Gotaverken Energy (brochure).
The Combined Sloping and Reciprocating Grate Design of the Bark Boiler Furnace–a Proven Method for Burining Deinking Sludge.
Wood–fired Boilder Performance When Firing Sludge, Gotaverken Energy–Oct. 28, 1992.

*Primary Examiner*—Henry C. Yuen
*Assistant Examiner*—Weilun Lo
*Attorney, Agent, or Firm*—Birch, Stewart, Kolasch & Birch

[57] ABSTRACT

The invention relates to a boiler for the production of steam, the boiler having a maximum capacity of 100 ton/hr or more and comprising a furnace having a substantially constant rectangular cross-section and a back pass with a substantially constant rectangular cross-section. The furnace and the back pass are mounted close to each other and means are provided for superheating the steam. The steam superheating means are positioned within the back pass, so that no superheater is positioned within the furnace.

23 Claims, 8 Drawing Sheets

STEAM BOILER

FIELD OF THE INVENTION

The invention relates to boiler for the production of steam having a maximum capacity of 100 ton/hr or more and more particularly to boilers capable of burning solid fuel. Such boilers comprise a furnace and a back pass, wherein said furnace and said back pass are mounted in close relation to each other. Such boilers are used as large power plants to produce superheated steam for driving steam-powered turbines.

BACKGROUND TO THE INVENTION

The fuel burner in these boilers principally comprises biomass, bark, deinking sludge and primary sludge as well as possible auxiliary fuels such as oil and gas.

The methods of burning (firing) of, in particular, bark and sludge have developed gradually over the past few decades and bark boilers are now expected to be able to handle not only wet bark and sludge with a moisture constant of 40–65% or more, but also to be able to cope with variations of load (so-called "load swings"), all without requiring firing of auxiliary fuels. An efficient technique for burning such fuels without using auxiliary fuels has been achieved by the use of a sloping grate combined with a final burn-out grate (e.g. of the reciprocating type such as made by Kablitz in Germany) immediately downstream of this. However these known boilers with a steam capacity of at least 100 tons/hr are very large and require hanging from a support structure, the price of said structure increasing steeply for a small increase in height and width of the structure.

Many different types of boilers exist today with varying combinations of features depending on the materials to be fired and the power output required, etc. However, steam generating boilers, which may be considered as prior art for this invention, are generally constructed with a central furnace and one or more lower grates on to which fuel is fed for burning. The walls of the furnace may comprise pipes for containing the water/steam which is to be passed, in a first stage, to the water/steam separation drum at the upper part of the furnace before proceeding on to a superheating stage.

The pipes themselves are joined to one another by being attached to flat joining members of steel sheet called membranes which thus allows the formation of a continuous wall of pipes.

The boilers of the prior art are expensive to construct due to the overall number of pipes, the type of pipes involved and due to the manner in which they are attached to various structural support members. Additionally, the systems for separating and later superheating the steam are complicated, difficult to design, difficult to manufacture and fit as well as being difficult to service.

For example, the steam separation system which comprises a separation drum (e.g. a cyclone separator) normally requires several pipes each extending from the upper steam side of the drum all the way to the inlets for the superheater(s), the superheaters being themselves positioned vertically in the furnace or the back draft. The fitting of such a multiplicity of pipes is inconvenient and expensive, but has previously been found necessary if an even steam distribution along the drum is to be achieved. Such an even distribution is however important in order not to disturb the moisture-removing function of the de-mister element which otherwise would produce detrimental effects on the turbine, such as deposits which cause unbalance in the rotor.

OBJECT OF THE INVENTION

An object of the invention is thus to improve the overall structure and efficiency of a boiler by the novel construction of its various elements and/or their combination. As a consequence, a boiler system may be provided which is, amongst other things, very compact, flexible with respect to its size and which results in low manufacturing, assembly, installation and maintenance costs.

Further objects and advantages of the invention will become apparent to the skilled reader from the following description of a preferred embodiment.

SUMMARY OF THE INVENTION

The boiler according to the invention has a maximum capacity of 100 ton/hr or more and comprises a furnace having a substantially constant rectangular cross-section and a back pass with a substantially constant rectangular cross-section, wherein said furnace and said back pass are mounted in close relation to each other, means being provided for superheating said steam, said steam superheating means being positioned within said back pass, so that no means for superheating the steam is positioned within said furnace.

Preferred aspects of the invention will be clear to the skilled man upon reading of the following description with reference to the accompanying drawings.

It will, for example, be clear to the skilled man that certain individual features of the boiler (e.g. the superheaters, downcomers, steam drum outlets etc.) may also be considered as inventions in their own right which may be combined with boilers of different type (e.g. having different types of grates and furnaces).

DETAILED DESCRIPTION OF A PREFERRED EMBODIMENT

Figure 1A:
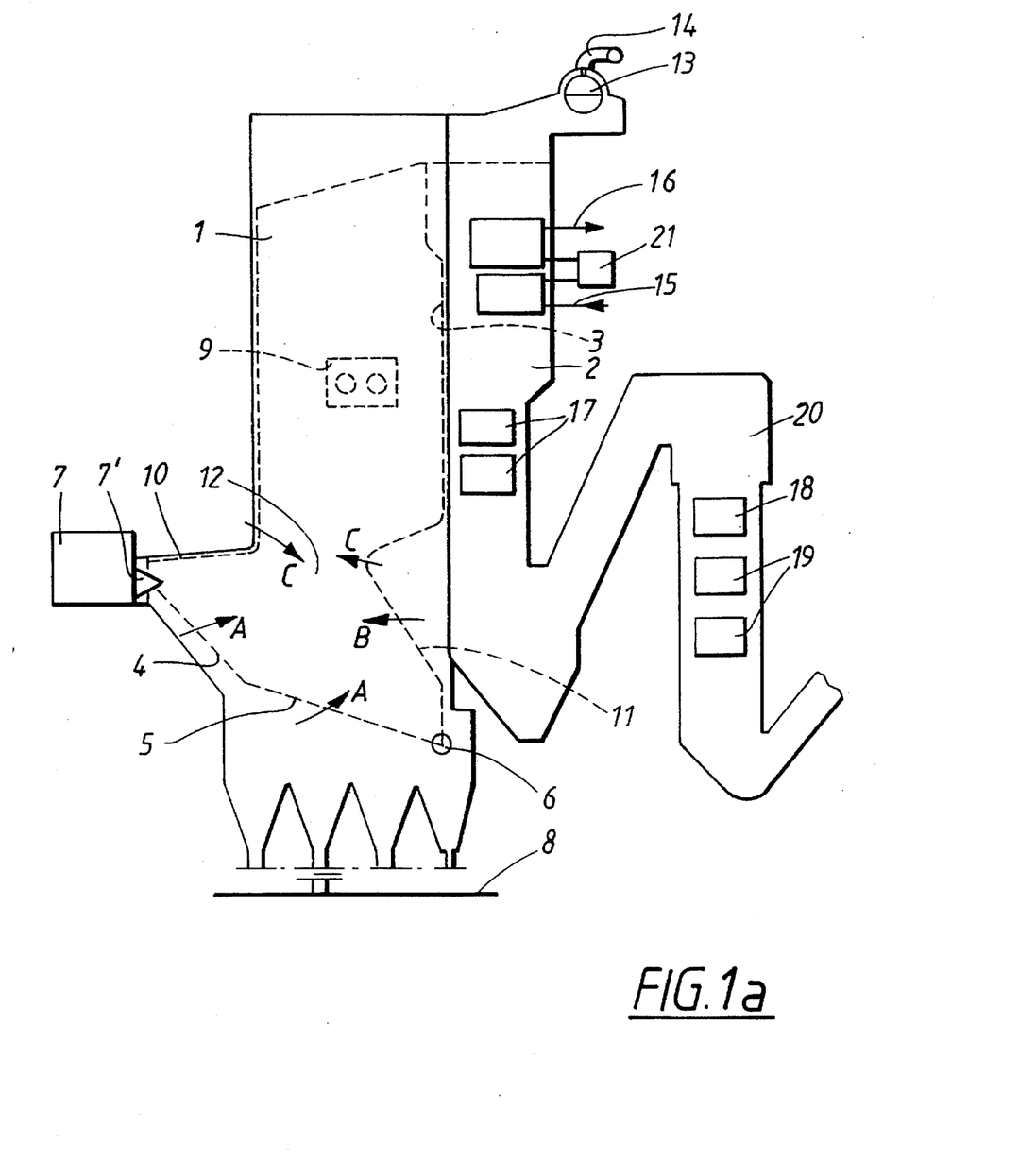
FIG. 1a shows a purely diagrammatical representation of a section of a power plant to which the invention relates, however with the back pass in line with the fuel feed (which is the conventional way of building such units), and thus connected on a different wall than with the present invention, merely for ease of explanation.
Figure 1B:
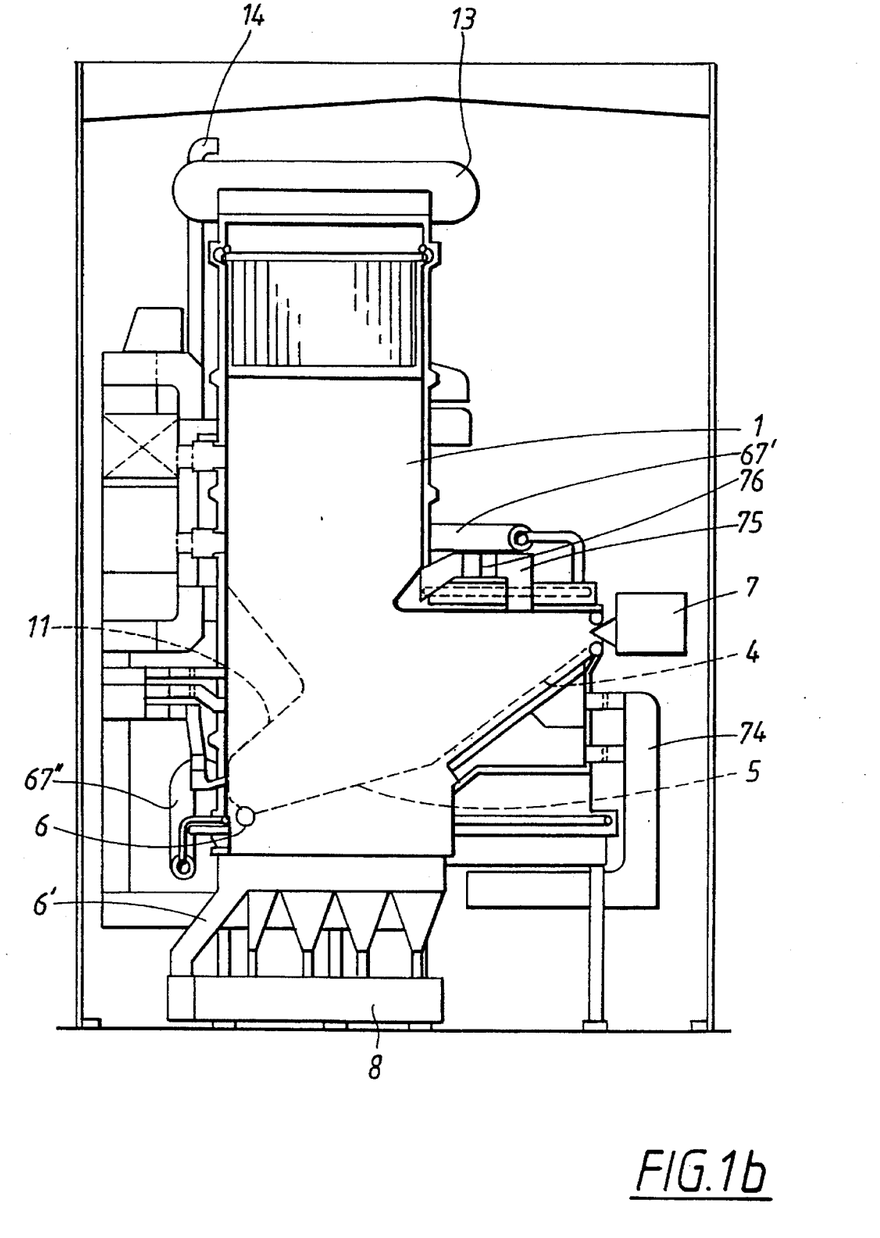
FIG. 1b shows a side view in partial section through a boiler of the invention, many parts having been removed for simplicity.
Figure 1C:
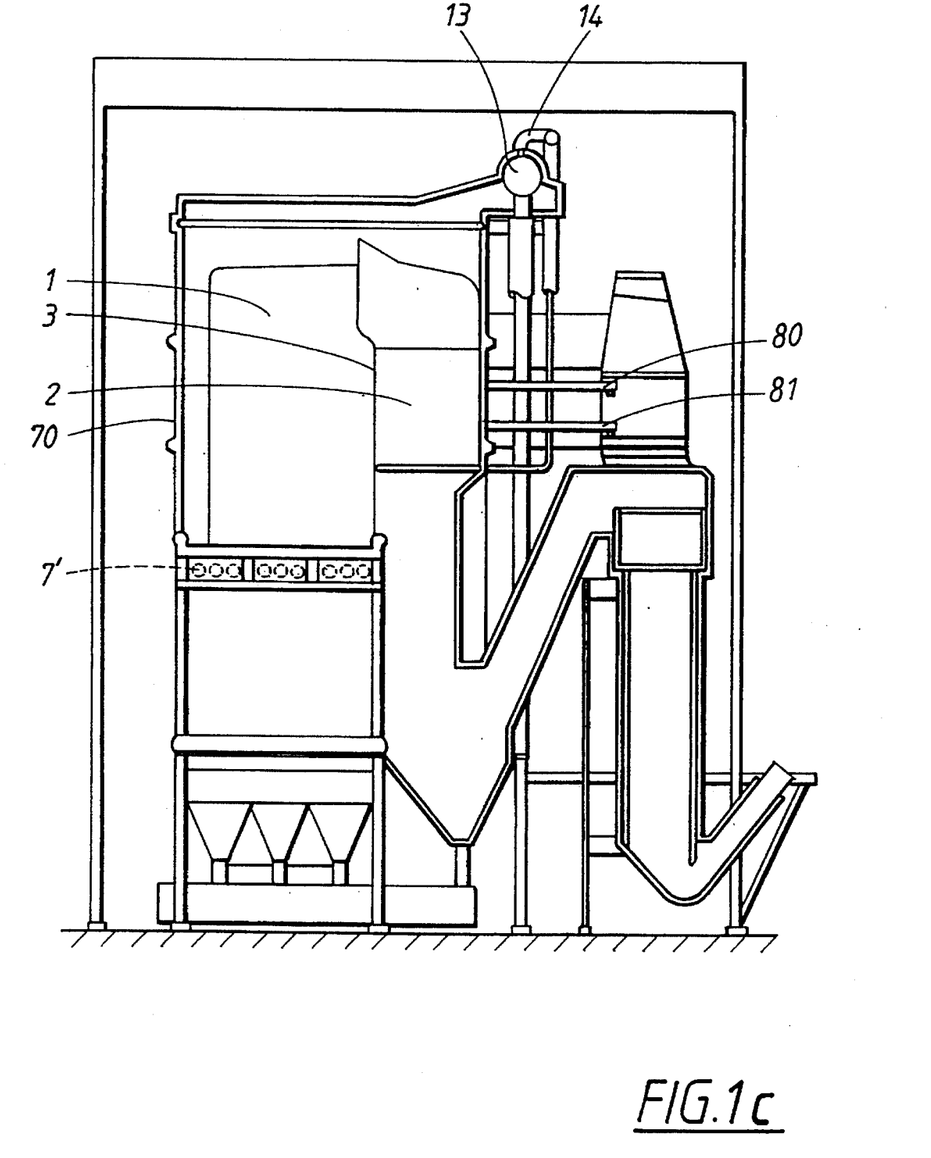
FIG. 1c shows a longitudinal, partial sectional view through a boiler according to the invention, many parts having been removed for simplicity.

The boiler of this invention is of the large type i.e. having a capacity capable of producing steam at the rate of 100 tons per hour or more. As shown in FIGS. 1a, 1b and 1c the boiler consists of two main sections, a furnace section 1 and one or more back pass (or back draft) sections 2, 20. In the illustrated example (see also FIGS. 1b and 1c) the first back pass 2 and the furnace 1 are separated from each other by means of a common dividing wall 3. Instead of a common wall 3 however, the furnace and the back pass could however be separated from one another by a certain distance, thus requiring individual opposing walls on each of the sections 1 and 2.

At the lower part of the furnace there is a combined grate section 4, 5, 6, onto which fuel is fed for firing. The fuel is fed from a feed unit 7, commonly a series of driven screw feeders 7' (see FIG. 1c), onto a first sloping grate section 4 which is constructed as a bare-tube membrane floor having individual pipes connected to each other by "fins" of flat sheet metal. The fins have a series of holes therein for the passage of air therethrough from the underside and are fitted with individual downstream-directed deflector plate sections (not depicted), known as eyelids, covering the holes to prevent the ingress of material from above the grate and also to minimise fluidizing of the bed.

A second grate section 5, e.g. of the reciprocating type such as a Kablitz grate, is positioned downstream of the first grate section 4. This section could for example comprise stationary and alternately interposed movable members. The members are typically serrated and stepped, and the reciprocating movement occurs at low velocity automatically over a period of e.g. a few minutes. In this way, fuel will be fed down along the grate towards the final or dump grate 6 where the ash is discharged onto an ash conveyor 8 below.

The dump grate 6 may simply be a manually operated grate which is actuated whenever the operator feels that this is required due to the build up of ash, or an automatically operated device functioning on e.g. a time basis, for instance twice a day.

While in the diagrammatic representation of FIG. 1a it is shown that the dividing wall 3 is above the dump grate, the wall 3 is in fact arranged on a side of the furnace which is parallel to the direction of feed on the grate section 4, 5, 6 as is clearly shown in FIGS. 1b and 1c. In other words, the furnace is at an angle of 90° to the longitudinal section of the boiler. As a result of this arrangement the feeding means 7 has a direction of feed parallel with the wall(s) dividing the furnace from the back pass. Thus, due to this and due to the chosen angle and position of the grate sections 4 and 5, it has been possible to locate the dump grate 6 on one side of the boiler, as opposed to the normally adopted position between the body of the boiler and the back pass, thus allowing the ash feeding out device 6' to be positioned on one side of the boiler only. Such an arrangement means that the structure of this high capacity boiler is very compact allowing it to be made as a standing boiler, hitherto not possible. If desired the boiler may be made partially or completely hanging instead, such as when retrofitting a boiler for example, which may reduce the refitting costs. Even if hanging is the option chosen, the compact arrangement of the boiler will mean that much shorter roof support beams will be required.

With the more preferred standing structure, moveable support such as sliding feet means for the base of the boiler must be provided in order to allow for expansion.

Due to this compact structure and arrangement, which allows the size to be as little as 60% of the size of previous boilers having the same capacity, the design of the downcoming system as well as the distribution system can be significantly simplified since a smaller number of pipes is required compared to previous constructions. The first back pass 2 for example, which contains the convection heating surfaces of the generating banks, can now be supplied by only two distribution pipes.

The arrows A, B and C in FIG. 1a denote the flow of primary, secondary and tertiary air respectively, which are input via suitable conduits from an air supply, e.g. a forced air supply from a fan.

A narrow throat or venturi section 12 is formed between the drying arch 10 and the burn-out arch 11 in order to allow a low amount of the excess air to be used while still maintaining a low content of unburnt matter. By means of the throat section 12, combustible gases and air are thus forced to mix. Additionally, improved burning can be effected by providing turbulence in this zone by means of tertiary air C being input at high velocity.

Above the throat, the furnace 1 presents an essentially constant rectangular cross-sectional area. In a similar manner, the back pass 2 has a cross-sectional area which is substantially rectangular and constant. The ratio of the cross-sectional areas of the furnace to the back pass ideally lies in the range of 2:1 to 6:1. This fact is a major contributor which influences the overall cost effectiveness of the boiler, since it provides, in combination with the reduced total footprint (covered ground area) and the features of this high capacity boiler, a minimal use of pipes, ducts and supports.

The constant cross-sectional areas of both the furnace and back pass thus allow a great flexibility with respect to the choice of overall size of the boiler since the back pass and furnace can be constructed as modules which are easily fitted together to give the required size. Moreover, the size of both the back pass and furnace can be modified separately by further modular addition if this is required. The overall structure of the boiler, which in part relies on the position of the air inlets (whereby the majority of air inlets can be arranged on one side only (see later description) make such a modular structure and modification even more readily usable.

The air inlets supplying the furnace are able to be positioned, due to the compact structure and arrangement of the boiler (due to a large extent to the aforementioned 90° furnace/boiler arrangement), such that the air supply (e.g. main fan duct) may be positioned in one corner of the housing such that only the supply conduits 74 for drying air and the supply conduit(s) 75 for secondary and tertiary air run from one vertically extending side of the boiler to the other. This results in a significantly reduced amount of air supply conduits to different parts of the furnace, compared to previous boilers of this capacity. In this way, it has now been achieved that more than 50% of the air, preferably more than 80% of the air, can be supplied to the furnace from only one side of the boiler, something which has hitherto not been feasible without very complicated and expensive pipe runs.

This minimal number of pipes ducts for channelling of air thus also allows easier modular expansion of the furnace and/or back pass.

Further, when the boiler is constructed so that at least one of its sides/walls 70 (see FIG. 1c) is free from traversing tubes, pipes or the like, expansion of the boiler on that side is greatly simplified.

The supply conduits for the secondary and tertiary air may if desired be joined in one joint conduit 75 which is divided by a separation wall 76 into two channels. Additionally, means for measuring the air-flow in said joint conduit may be provided, comprising one single unit which penetrates the separation wall 76 in said joint conduit.

One or more oil and/or gas inlets 9 for supplying oil and/or gas are positioned in the furnace for the case that either should be required for assisting ignition start-up and/or to cope with very high loads or severe load swings.

The hot flow gas from the furnace passes through one or more openings in the upper part of the furnace wall 3 and is directed downwardly into the back pass 2.

A water/steam separator drum 13 (e.g. including a cyclone separator) having a single steam outlet 14 is positioned at the top of the boiler. This steam drum 13 will be described in more detail later. Depending on the size of the boiler, further drums 13 may also be fitted. The water/steam mixture which collects on the water side of the drum 13 after separation is transferred back to the walls of the boiler by means of pipes called "downcomers" which are normally present in large numbers in prior art devices. However, with the boiler of this invention it is now possible to limit the number of downcomers to less than four. Moreover, it has also been achieved that only two metal downcomers having a relatively large diameter and thickness of, for instance, 450 mm and 60 mm respectively, can be suitably used. Such downcomers have sufficient strength in order that the downcomers themselves may provide the structural support for the drum 13 from below (bottom support). The downcomers may even be used to provide support for other parts of the boiler. Two downcomers of such dimension are more expensive than the many smaller ones of the prior art. However their use directly results in a significant number of more important advantages, which reduce overall cost significantly.

In the case that the downcomers provide support for the drum, they will also have to be mounted, directly or indirectly onto some sliding arrangement to account for boiler expansion.

The pipes which are part of the sidewalls of the grate section may also function as part of the downcoming system for partial supply of the furnace boiler tubes, these being fed via a small number of large diameter distribution branches 67', 67" (see e.g. FIG. 1 b) from the downcomers.

Figure 3:
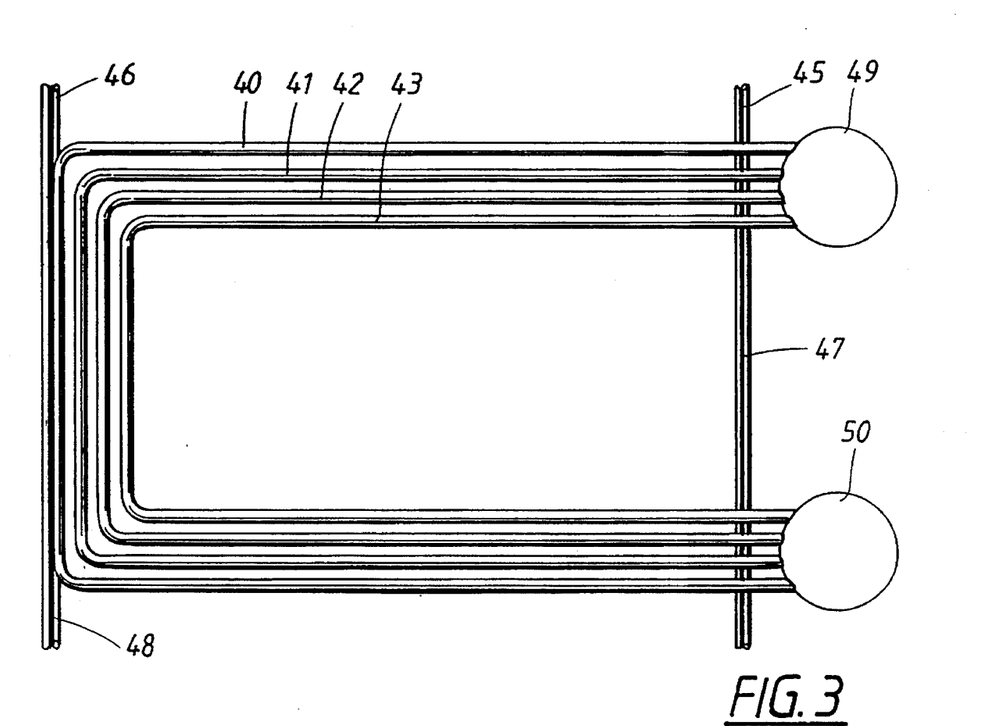
FIG. 3 shows a schematic view (not to scale) of the superheater connections.

Moving in a direction downstream along the back pass, a secondary superheater stage 15 is arranged above a primary superheater stage 16, the inlet to the primary superheater being fed from the outlet 14 of the drum 13 into a header 49, 50 (see e.g. FIG. 3). The construction of the superheaters will be explained in more detail later.

Efficiency of the superheating stage may be increased by using an attemperator 21 (known per se) for injecting water into the steam between the two superheating stages 15 and 16.

Reference 17 denote a steam generation bank section which uses heat from the flow gas for supplying additional steam to the drum 13. While only two banks are shown, it is clear that any suitable number may be used. The generation bank 17 is preferably formed by convection boiler tubes which form a flag heater surface (i.e. in the shape of a flag). The boiler tubes may also be part of the wall which divides the boiler from the back draft 2 and thus provides support therefor.

On arriving at a lower section of the back pass 2, the hot flow gas is diverted back upwardly before arriving at a second back pass 20, in which both an air heater 18 and one or more economizer banks 19 are positioned.

The air heater 18 is used for additional heating of the primary air A which is fed from the fan into the sloping bare-tube grate 4 in order to act as drying air, e.g. for wet bark, and may thus be capable of heating the air to 350° C. or more. Additional means may also be provided for heating the primary air such as a steam coil air heater (not shown).

The economizer banks 19 are used to extract remaining heat in the flow gas for initially heating the feed water used in e.g. the furnace walls.

Figure 2:
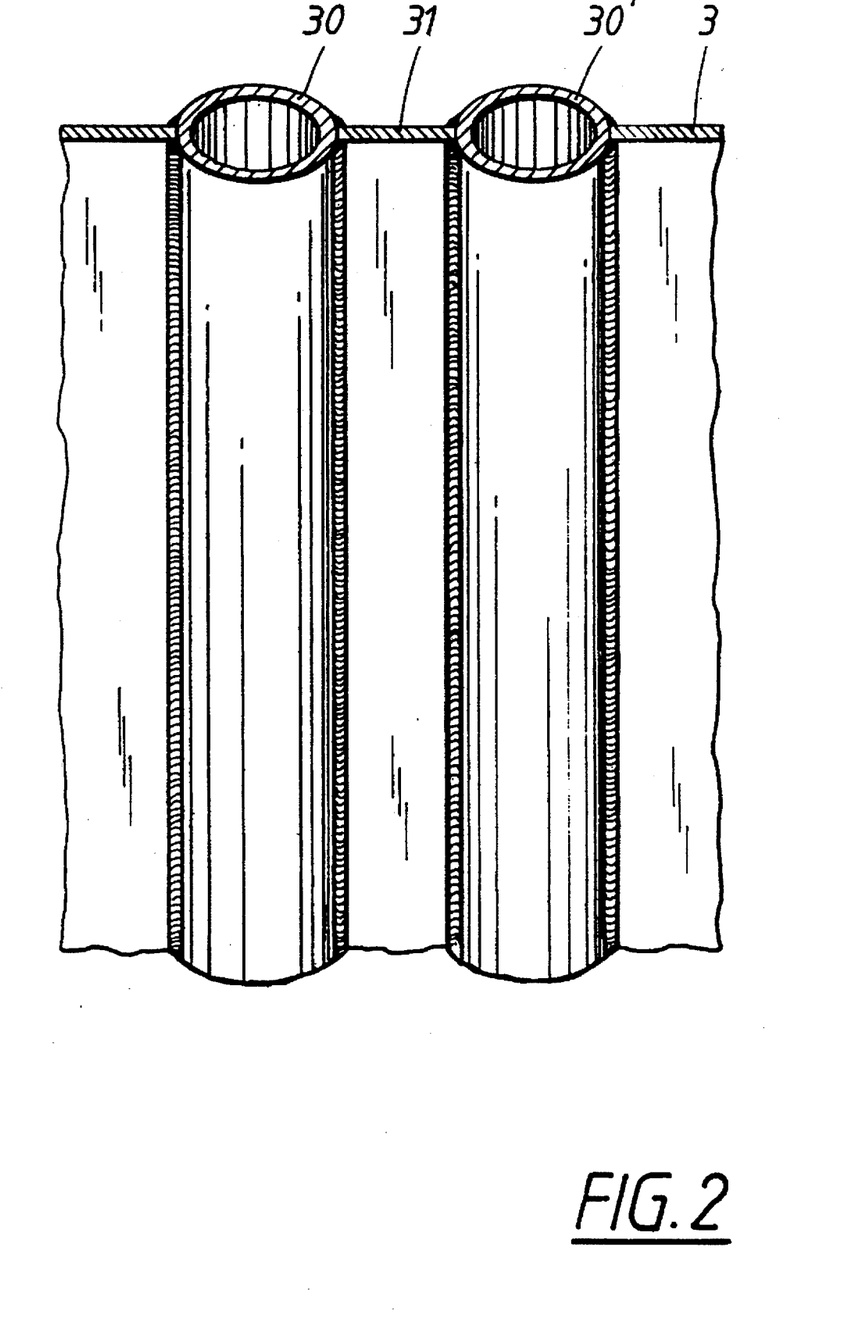
FIG. 2 shows a section of wall panel for a boiler according to the invention.

The walls of the boiler comprise a series of panels, a portion of one of said panels being shown in FIG. 2. A panel consists of pipes 30, 30' etc. for carrying the water/steam mixture in the boiler, said pipes being interconnected by fins 31 of metal plate which are double seam welded (i.e. seam welded on either side) onto one side of two respective pipes along diametrically opposed parts of each pipe as shown.

The construction of such panels and the widths of the fins 31 is of particular importance concerning the aspect of connecting the superheaters to the walls of the back pass which, as will be described below, occurs in an entirely new manner according to one aspect of the present invention.

The superheaters are positioned substantially horizontally in the back pass. In large boilers of the prior art, the superheaters are hung in the upper part of the furnace such that the superheater pipes extend vertically downwardly into the furnace. Additionally, in prior art devices, a complicated design and fitting of various connection brackets is required between the individual pipes of the superheaters and the walls of the furnace to enable an adequately rigid structure to be produced capable of withstanding the thermal loads which would otherwise lead to bending and distortion of the tubes.

FIG. 3 shows a partially schematic representation of one panel of a superheater 15 or 16 of FIG. 1a, located inside the back pass 2. Positioning in the back pass allows the superheater(s) to be shielded from flame, which not only guarantees a longer life, but also reduces the formation of deposits on the superheaters with direct flame action and thus maintains efficiency. The temperature in the back pass is also less than in the furnace.

The walls of the back pass are made up of alternate pipes 45, 46 and fins 47, 48. This structure can be seen clearly in FIGS. 5 and 6. As is shown, the pipes 40, 41, 42, 43 of the superheater are positioned between the steam header 50 and the steam header 49.

Figure 4:
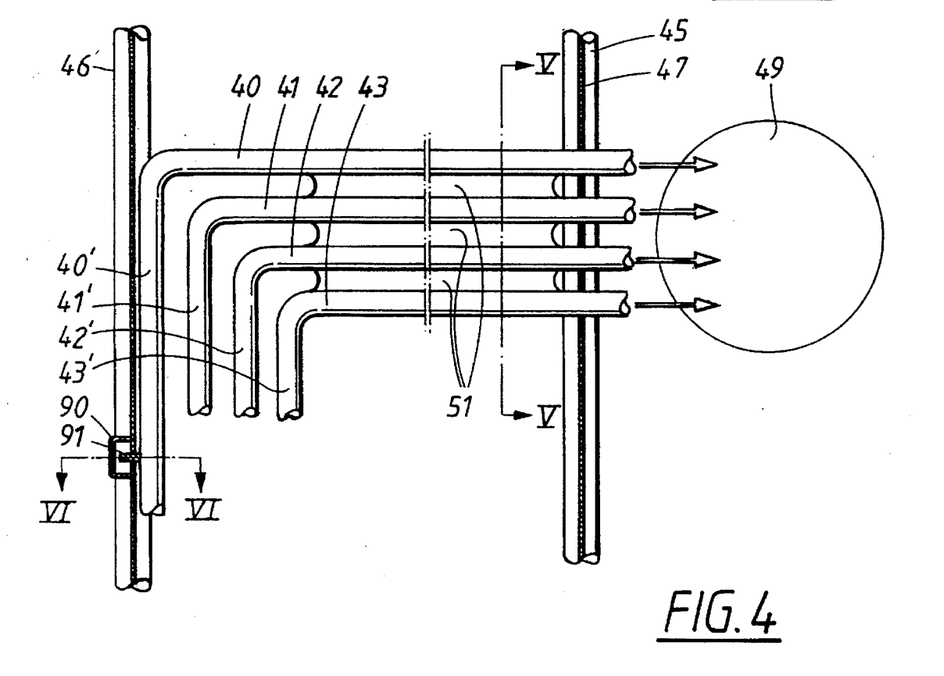
FIG. 4 shows an enlarged section view (not to scale) of the upper part of the superheater of FIG. 3 in which the middle section has been deleted.

As shown in FIGS. 3 and 4, the pipes 40–43 are positioned horizontally and pass across substantially the total width of the back pass 2 between the vertical walls. The free length of the pipes (i.e. the self supporting length of the pipes) normally exceeds 2 m, preferably 2.5 m and even more preferably 3 m or more. Thus, in the embodiment depicted in FIG. 4, if the width of the back pass was 6 m, the pipes 40 to 43 might require only one, centrally-positioned, intermediate, vertical hanger support (not shown) giving a free length of approximately 3 m for the pipes. At the other wall of the back pass (left-hand wall in FIG. 4), the pipes diverge downwardly as substantially vertical sections 40'–43' and then back horizontally to the superheater header 50.

Due to the relatively long length to the superheater pipes 40 to 43, only a small number of panels consisting of pipes and fins is required, with the result that a shorter superheater header pipe 49, 50 is possible. This in turn means that there is no requirement to have two outlets from the superheater stage, such having hitherto been required in prior art boilers of this capacity to avoid the problems of overheating due to flow unbalance. Thus since there need only be one connection conduit between the primary and secondary superheaters, only one attemperator section is required. Significant cost savings therefore result and it will be clear to the skilled man that this superheater arrangement may also find application in different types of boilers.

Figure 5:
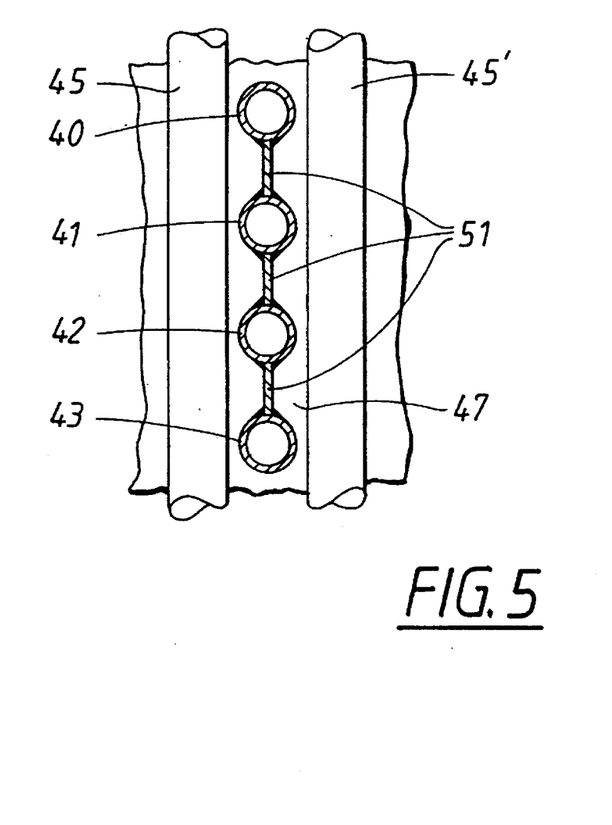
FIG. 5 shows a section view taken along line V—V in FIG. 4.
Figure 6:
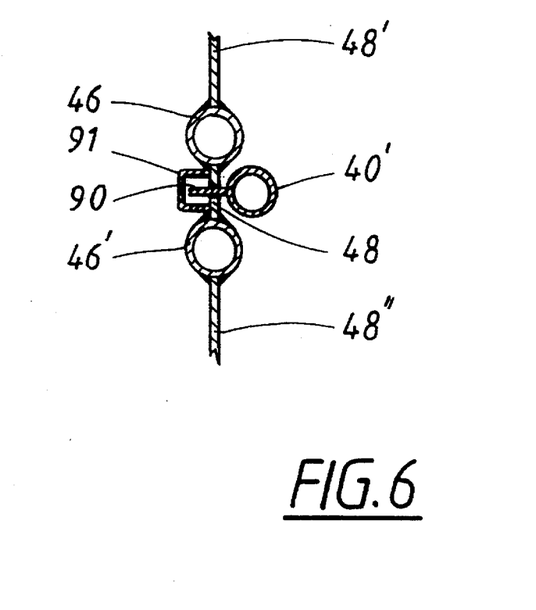
FIG. 6 shows a section view taken along line VI—VI in FIG. 4.

As can be seen from FIG. 5 and FIG. 6, double seam-welded fins 51 are arranged between each of the pipes 40–43 to act as the support means to resist the deformation forces of thermal loading at this point. In this way, the prior art method which required expensive and time consuming fitting and installation of many clamps and brackets etc. between the individual pipes and to the walls of the boiler is no longer required.

The thermal load on the fins 51 results from the temperature of the flue gas at this point which may be around 800° C. for example. However, the steam in the pipes 40 to 43 is at a lower temperature and, due to the fact that the fins 51 are connected to the pipes along a large portion thereof by continuous double seam welds, the fins 51 are thus effectively cooled by the effect of the steam.

The distance between the pipes 45 and 45' in the back pass wall, as shown in FIG. 5, which determines the width of the fins 47 which span this distance, is such that the diameter of the pipes 40 to 43 is less than the distance between two adjacent pipes 45, 45'. In this way the horizontal pipes 40 to 43 may pass through the fin 47 of the wall panel without involving the complications of bending the various pipes, as required by vertical superheaters. This larger dimensioning of the fin width between pipes 45 and 45', to accommodate the pipes 40–43, is made possible due to the fact that the superheater is positioned in the back pass where lower temperatures occur.

Additional lateral support for the pipes 40 to 43 is provided by the back pass wall closest to, or in common with, the furnace. As can best be seen in FIG. 6, the wall of the back pass is formed by alternating pipes 46, 46' and fin sections 48, 48' and 48" similar to the other wall of FIG. 5. The vertically extending portion 40' of the superheater (see also FIG. 4) is supported against sideways movement by its position between the pipes 46 and 46' and the use of a pin 90 connection with associated sealing cap 91 (see FIG. 6). Thus no bracket or clamp of any type is required to secure the part 40' to the fin 48, which results in significantly easier installation and maintenance compared to prior art installations.

Sootblowing means 80, 81, such as steam lance means, are positioned in the back pass 2 and act to clean the surfaces of the various elements such as the superheaters. Due to the arrangement of the boiler, the steam lances, including (where required) further sootblowing means for the generator banks etc., may be placed in the back pass sections without requiring any extra space in the building which houses the boiler, than that provided already.

Figure 7:
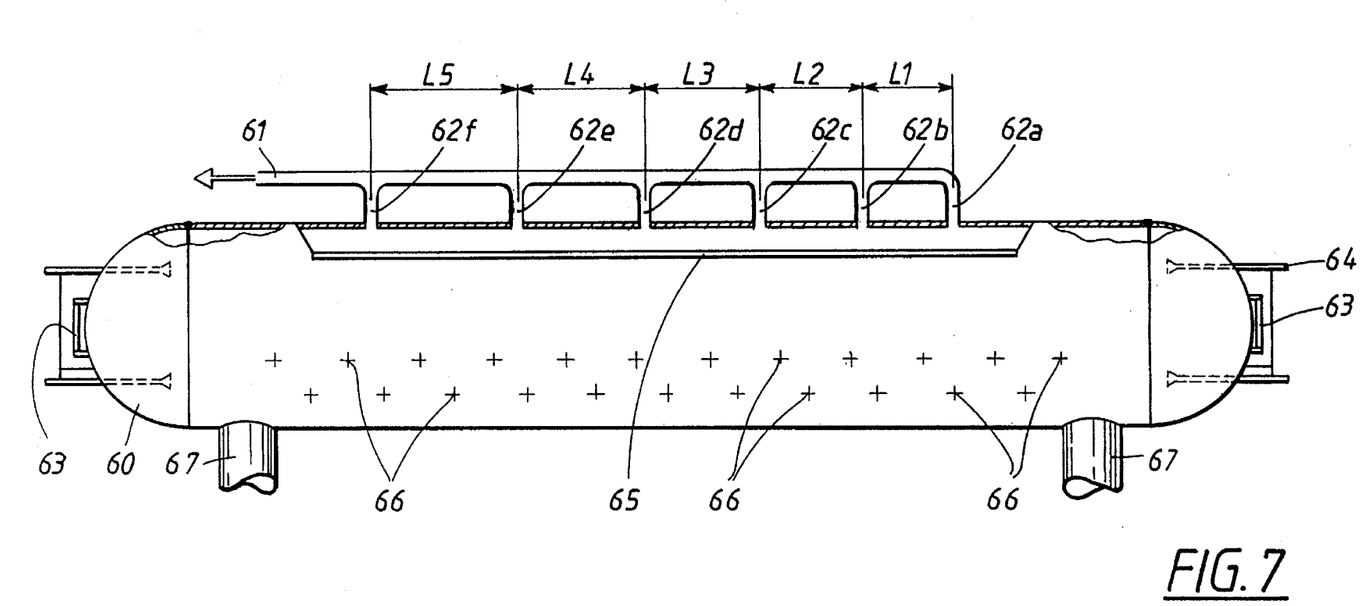
FIG. 7 shows a steam drum in accordance with the one aspect of the invention.
Figure 8:
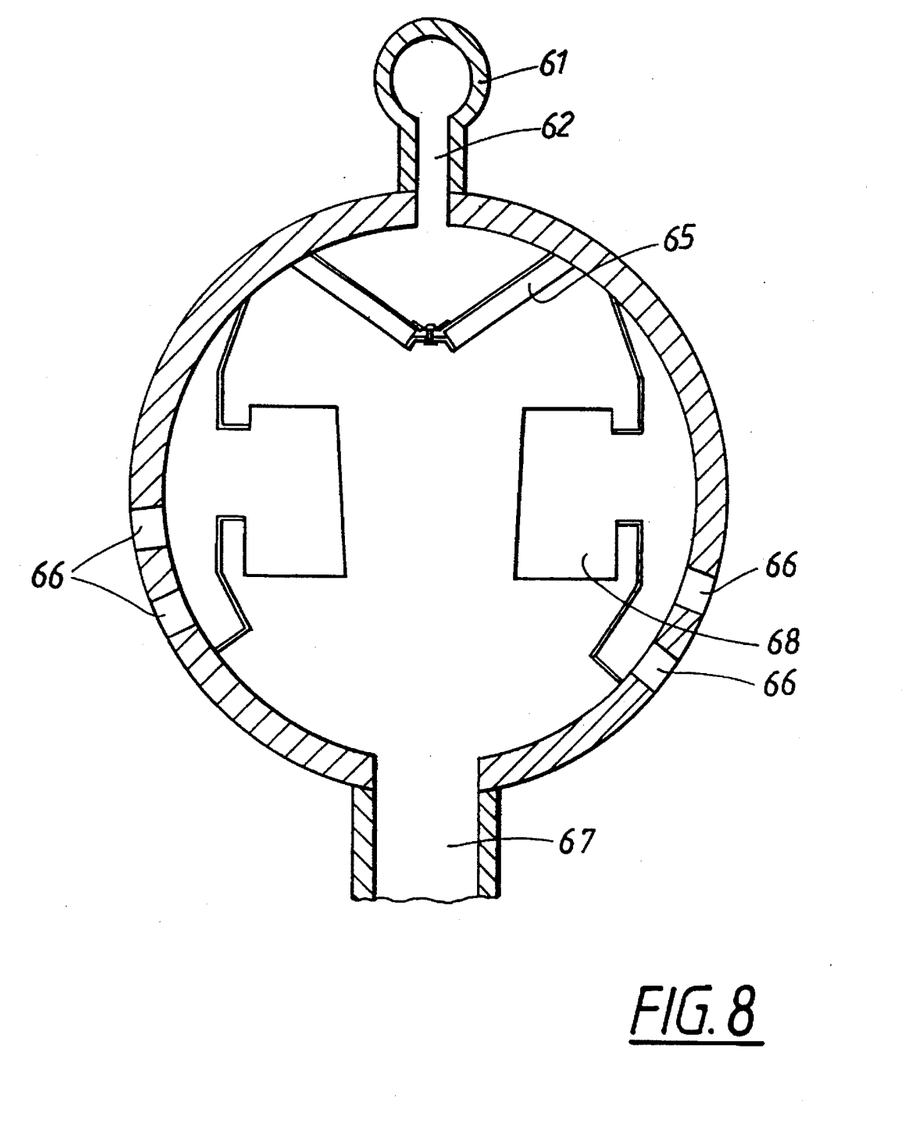
FIG. 8 shows a sectional view of the drum of FIG. 7.

FIGS. 7 and 8 show a steam drum 60 with a steam outlet 61, corresponding respectively to drum 13 and pipe 14 in FIGS. 1a to 1c. The steam drum may have a diameter of about 2 meters, some 80 mm wall thickness and about 100 mm end face thickness. Access doors 63 and instrument connections 64 are located at either end of the drum and two downcomers 67 support the drum from below. Inside the upper part of the drum there is arranged a steam demister 65 of a per se known type which is the final separation point of any water from the steam which is present in the drum having been inlet through the vapor/water inlets 66. In accordance with one particular aspect of the invention, which may be used in other boilers also, there is only one saturated steam outlet pipe 61 fed by several saturated steam outlet connections 62a to 62f each having substantially the same internal diameter. This is made possible by the particular choice of each of the distances L1 to L5 between each of the pipes which thus results in an even flow across the length of the demister. In order to achieve this even flow, the distance L1 between the first and second pipes 62a, 62b is related to the distance L2 between pipes 62b and 62c by the following approximately quadratic relationship:

$$L_n = a + kn^b$$

where "k" and "a" are constants chosen according to the circumstances (e.g. drum diameter, drum length, non-interference with other equipment etc.), "b" is substantially 2 but may vary slightly (e.g. to about 1.8) and n is the $n^{th}$ distance between pipes.

The same relationship holds true for the remainder of the pipes also (i.e. for determining distances L2, L3, L4 etc.). It should be noted here that while six pipes 62a–62f have been illustrated, it is clear that any appropriate number could be used.

An example of distances L1–L5 for one particular arrangement is approximately as follows: L1=900 mm, L2=1000 mm, L3=1100 mm, L4=1200 mm and L5=1400 mm.

By using only one saturated steam pipe 61 from the drum 60 and a plurality of equal diameter pipes 62a to 62f, a simple and very cost effective result is achieved.

A further manner of arriving at the same effect as described above is to have a plurality of equal diameter pipes 62a to 62f feeding into one single saturated steam pipe 61. In order to achieve an even flow, the steam connection pipes 62a to 62f are then provided with throttling means which would be either preset or variable, but arranged so that a substantially quadratic relationship of pressure drop between the outlet connections 62a to 62f is achieved. In this way, the distance between the pipes may be made constant, in addition to them having the same internal diameter.

DESCRIPTION OF OPERATION

After start-up of the boiler, fuel, such as wet bark for example, is fed in from feed unit 7. The amount of fuel fed into the furnace depends on the prevailing load conditions. The fuel is first dried on the sloping bare-tube grate 4 by primary, high-temperature (e.g. above 100° C. or even more than 350° C.) drying air A coming from below the grate 4. Due mainly to gravity, the fuel passes down the grate 4 on to the reciprocating grate 5 (e.g. a Kablitz grate) where it is transported by reciprocal motion along the grate while being fired before it has become ash to be discharged from the dump grate 6. The heat output of the boiler can be increased by supplying more air and more fuel, and assisted by supplying auxiliary fuel via inlets 9, connected to fuel and air sources. In a way known per se, the heat energy produced heats the water/steam mixture which is present in the furnace walls such that steam passes to the drum 13 for further separation. The hot gas flow proceeds onward downstream to the back pass 2 after passing through the dividing wall 3, heating the various surfaces in its path.

The steam which has entered drum 13, 60 via inlets 66 (see FIG. 8) passes through the cyclone separator unit(s) in order that water will be separated from the steam. This separated water is passed back to the boiler walls via the downcomers 67 which feed the water partly into branch distribution pipes such as 67' and 67". The steam passes through demister 65 and into the various outlets 62a–f into the pipe 61 which feeds into the primary superheater 16. The steam flows through these pipes and is further heated by the flow gas passing thereover. At its elevated temperature, the steam passes through an attemperator 21, which e.g. injects water and cools it, and then into the secondary superheater 15. The steam is then heated as it passes through the superheater 15 and is then finally used to drive a turbine.

The heat of the flow gas avoidable in the back pass after passing the superheaters is transferred to units 17, 18 and 19 which have the functions described previously.

Whilst certain embodiments of the invention have been described above, it will be clear to the skilled man that many variations are possible within the scope of the appended claims. For example it will be evident to the skilled man that instead of using a sloping grate, an AFB (Atmospheric Fluidized Bed)—bottom could be used. Certain features of the furnace (such as the drum design and the superheater design) could of course be used per se in connection with other boiler configurations.

We claim:

1. A steam boiler having a steam capacity of 100 ton/hr or more comprising a furnace, a back pass, said furnace and said back pass being mounted in close relation to each other with a dividing wall structure therebetween, superheating means for superheating steam, said steam superheating means including a primary superheater, said primary superheater being positioned within said back pass, and an attemperator interconnected with said primary superheater, and at least one steam drum and a downcoming system, each of said at least one steam drum having a series of steam outlet connection pipes extending therefrom and a steam supply conduit, each of said series of steam outlet connection pipes connecting with said steam supply conduit, said steam supply conduit connecting with said primary superheater, wherein said series of steam outlet connection pipes includes n sequentially adjacent pairs of steam outlet connection pipes, each said sequentially adjacent pair having a distance $L_n$ between the steam outlet connection pipes thereof, wherein n is the number of said sequentially adjacent pair and Ln is the associated distance for said sequentially adjacent pair, said distance $L_n$ being determined by the following expression $$L_n = a + kn^b$$

where "a" and "k" are constants, and "b" is substantially 2.

2. The boiler according to claim 1, wherein said dividing wall structure is a common wall.

3. The boiler according to claim 1, wherein said boiler is adapted to burn a solid fuel, in particular a biomass fuel.

4. The boiler according to claim 1, further including at least one steam generation bank, each said at least one bank including a plurality of convection boiler tubes, said at least one bank being disposed in said back pass and being attached to said dividing wall structure to thereby support said dividing wall structure.

5. The boiler according to claim 1, wherein said furnace and said back pass are modular units, whereby the size of said furnace and the size of said back pass can be determined independently of each other.

6. The boiler according to claim 1, wherein said furnace consists essentially of a substantially constant rectangular cross-sectional area portion, and said back pass has a substantially constant rectangular cross-sectional area portion, the ratio between the cross-sectional area of said furnace to the cross-sectional area of said back pass is in a range of 2:1 to 6:1.

7. The boiler according to claim 1, further comprising a plurality of transversing tubes, wherein said furnace further consists essentially of a first, second and third vertically extending outer side wall, at least one of said transversing pipes being disposed outward of only two of said outer side walls selected from a group consisting of said first, second and third outer side walls.

8. The boiler according to claim 7, wherein said furnace further consists essentially of a sloping grate which has a direction of feed parallel with said dividing wall structure.

9. The boiler according to claim 8, wherein said furnace further consists essentially of a feeding-out device for ashes disposed adjacent a lower end of said sloping grate and in proximity to one of said outer side walls of said furnace.

10. The boiler according to claim 1, further comprising at least one steam drum and a downcoming system, said downcoming system including a number of downcomers to provide support for each of said steam drums from an underside thereof, said number of downcomers being a number selected from one, two and three.

11. The boiler according to claim 10, wherein the number of downcomers is two.

12. The boiler according to claim 1, wherein said furnace further consists essentially of a grate with sidewalls, said grate including a plurality of pipes, said pipes being part of the downcoming system.

13. The boiler according to claim 1, wherein said boiler has a bottom support structure, said structure extending upward from a support surface to support from beneath the weight of said furnace and said back pass at lower surfaces thereof.

14. The boiler according to claim 1, wherein said plurality of convection boiler tubes are arranged in the form of a flag.

15. The boiler according to claim 8, further comprising a plurality of air supply conduits which supply air to said furnace, said plurality of air supply conduits being connected by a plurality of air inlets to said furnace, a majority of said air inlets being disposed at one of said outer side walls of said furnace to provide more than 60% of air to be supplied to said furnace.

16. The boiler according to claim 1, further comprising at least one superheater stage, each of said superheater stages comprising arrays of horizontally extending superheater tubes across substantially the whole width of said back pass and metal plate fins welded between each adjacent pair of said superheater tubes, said superheater tubes having a predetermined outer diameter.

17. The boiler according to claim 16, wherein said back pass has a plurality of vertically extending walls, each of said walls comprising a plurality of tubes in spaced apart relationship and a plurality of fins, one of said fins interconnecting each adjacent pair of said tubes, said fins having a width equal to or greater than the diameter of said superheater tubes.

18. The boiler according to claim 16 further comprising a sootblowing system including at least one steam lance means for cleaning a surface of said at least one superheater, said at least one steam lance means being disposed in said back pass in such a way that no extra space is needed for placement of said at least one steam lance means within a building surrounding said boiler.

19. A steam boiler having a steam capacity of 100 ton/hr or more comprising:

a furnace;

a back pass, said furnace and said back pass being mounted in close relation to each other with a dividing wall structure therebetween;

superheating means for superheating steam, said steam superheating means including a first superheater and a second superheater and being positioned within said back pass;

an attemperator, said attemperator being interconnected between said first and second superheaters; and at least one steam drum wherein each said at least one steam drum includes a plurality of steam outlet connection pipes, a steam supply conduit which feeds said primary superheater, and a throttling means for individually throttling said steam outlet connection pipes in order to give a substantially quadratic relationship of pressure drop between adjacent said steam outlet connection pipes, thus creating even flow conditions along the length of each said at least one steam drum.

20. A steam boiler having a steam capacity of 100 ton/hr or more comprising:

a furnace;

a back pass, said furnace and said back pass being mounted in close relation to each other with a dividing wall structure therebetween;

superheating means for superheating steam, said steam superheating means being positioned within said back pass;

a plurality of transversing tubes; and a plurality of air supply conduits which supply air to said furnace, said plurality of air supply conduits being connected by a plurality of air inlets to said furnace, a majority of said air inlets being disposed at one of said outer side walls of said furnace to provide more than 60% of air to be supplied to said furnace; wherein said furnace consists essentially of a sloping grate which has a direction of feed parallel with said dividing wall structure.

21. The boiler according to claim 20, wherein said plurality of air supply conduits include a primary air supply conduit, a secondary air supply conduit and a third air supply conduit for supplying primary air, secondary air and tertiary air, respectively, and wherein a portion of the primary air is supplied as drying air, said supply conduits being arranged in such a manner that said supply conduits for the drying air and said secondary and tertiary air supply conduits run from one of said outer side walls to another of said outer side walls opposite thereto.

22. The boiler according to claim 21, wherein the secondary air supply conduit and the tertiary air supply conduit are combined in one joint conduit with a separation wall separating said secondary air supply conduit from said tertiary air supply conduit.

23. The boiler according to claim 22, wherein measuring means for measuring the air-flow in said one joint conduit are provided, said means being made of one single unit which penetrates said separation wall in said one joint conduit.

* * * * *